(12) United States Patent
Senoo

(10) Patent No.: US 11,588,365 B2
(45) Date of Patent: Feb. 21, 2023

(54) STATOR AND MOTOR

(71) Applicant: FANUC CORPORATION, Minamitsuru-gun (JP)

(72) Inventor: Tatsuya Senoo, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 161 days.

(21) Appl. No.: 17/081,486

(22) Filed: Oct. 27, 2020

(65) Prior Publication Data

US 2021/0135528 A1 May 6, 2021

(30) Foreign Application Priority Data

Oct. 31, 2019 (JP) .............................. JP2019-198075

(51) Int. Cl.
*H02K 3/00* (2006.01)
*H02K 3/28* (2006.01)

(52) U.S. Cl.
CPC ...................... *H02K 3/28* (2013.01)

(58) Field of Classification Search
CPC ........... H02K 3/28; H02K 3/345; H02K 3/12; H02K 3/522; H02K 1/16
See application file for complete search history.

(56) References Cited

U.S. PATENT DOCUMENTS

| 9,525,313 | B2* | 12/2016 | Foulsham | H02K 15/06 |
| 2012/0001513 | A1* | 1/2012 | Kawano | H02K 3/28 |
| | | | | 310/208 |
| 2012/0025658 | A1* | 2/2012 | Watanabe | H02K 15/0081 |
| | | | | 310/179 |
| 2014/0015356 | A1* | 1/2014 | Chamberlin | H02K 9/227 |
| | | | | 310/216.074 |
| 2014/0300238 | A1* | 10/2014 | Lau | H02K 3/28 |
| | | | | 310/208 |
| 2015/0048693 | A1* | 2/2015 | Prussmeier | B65G 54/02 |
| | | | | 310/12.09 |
| 2016/0181880 | A1* | 6/2016 | Sugishima | H02K 3/28 |
| | | | | 29/598 |
| 2018/0351427 | A1* | 12/2018 | Kuroyanagi | H02K 15/065 |
| 2019/0207455 | A1* | 7/2019 | Herrada | H02K 3/16 |
| 2019/0207456 | A1* | 7/2019 | Herrada | H02K 3/16 |
| 2020/0028424 | A1* | 1/2020 | Norris | H02K 29/03 |
| 2020/0036251 | A1* | 1/2020 | Asano | H02K 21/44 |
| 2020/0169135 | A1* | 5/2020 | Totsuka | H02K 5/04 |
| 2020/0303975 | A1* | 9/2020 | Senoo | H02K 1/165 |
| 2020/0358324 | A1* | 11/2020 | Sugimoto | H02K 1/17 |
| 2020/0395824 | A1* | 12/2020 | Hashimoto | H02K 13/04 |
| 2022/0140685 | A1* | 5/2022 | Mawatari | H02K 3/34 |
| | | | | 310/195 |

FOREIGN PATENT DOCUMENTS

JP 2010-213493 A 9/2010
JP 2013-253615 A 8/2013

* cited by examiner

*Primary Examiner* — Phutthiwat Wongwian
*Assistant Examiner* — Sherman D Manley
(74) *Attorney, Agent, or Firm* — McGinn I.P. Law Group, PLLC.

(57) ABSTRACT

A stator includes multiple coils. The coils include multiple outer coils arranged on the base side of teeth and multiple inner coils arranged on the tip side of the teeth. The outer coils and the inner coils are alternately arranged along the circumferential direction of a stator core. Each coil winding of the outer coils is formed in a non-fixed state, and each coil winding of inner coils is formed in a fixed state.

18 Claims, 3 Drawing Sheets

STATOR AND MOTOR

CROSS-REFERENCE TO RELATED APPLICATION

This application is based upon and claims the benefit of priority from Japanese Patent Application No. 2019-198075 filed on Oct. 31, 2019, the contents of which are incorporated herein by reference.

BACKGROUND OF THE INVENTION

Field of the Invention

The present invention relates to a stator and a motor.

Description of the Related Art

A stator includes a stator core, a plurality of teeth protruding toward the central axis of the stator core, and coils provided in the respective teeth. Japanese Laid-Open Patent Publication No. 2013-153615 discloses a concentrated winding motor in which each coil is attached to a tooth by inserting a tubular coil bobbin from the protruding tip side of the tooth.

SUMMARY OF THE INVENTION

In the concentrated winding motor of Japanese Laid-Open Patent Publication No. 2013-153615, there are two coils between adjacent teeth, i.e., a first coil attached to one tooth and a second coil attached to another tooth adjacent to the one tooth.

In order to insulate the first coil and the second coil, it is necessary to provide a clearance between the first coil and the second coil along the direction in which the teeth extend. Therefore, the ratio (space factor) of the coils in the space between two adjacent teeth tends to decrease. Further, as the distance between two adjacent teeth in the circumferential direction of the stator core becomes shorter, the space factor tends to decrease further.

It is therefore an object of the present invention to provide a stator and a motor capable of suppressing the decrease in space factor.

The first aspect of the invention resides in a stator including: a stator core; a plurality of teeth provided on the stator core at intervals along the circumferential direction of the stator core and protruding from the stator core toward the central axis of the stator core; and a plurality of coils provided respectively on the teeth, wherein: the plurality of coils include a plurality of outer coils arranged on a base side of the teeth and a plurality of inner coils arranged on a tip side of the teeth; the plurality of outer coils and the plurality of inner coils are alternately arranged along the circumferential direction of the stator core; and each coil winding of the plurality of outer coils is formed in a non-fixed state, and each coil winding of the plurality of inner coils is formed in a fixed state.

The second aspect of the invention resides in a motor including the above-described stator and a rotor.

According to the aspects of the present invention, it becomes unnecessary to create a clearance between the coils along the direction in which the teeth extend, thus making it possible to suppress the decrease in space factor.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A preferred embodiment of the present invention will be described below in detail with reference to the accompanying drawings.

Embodiment

Figure 1:
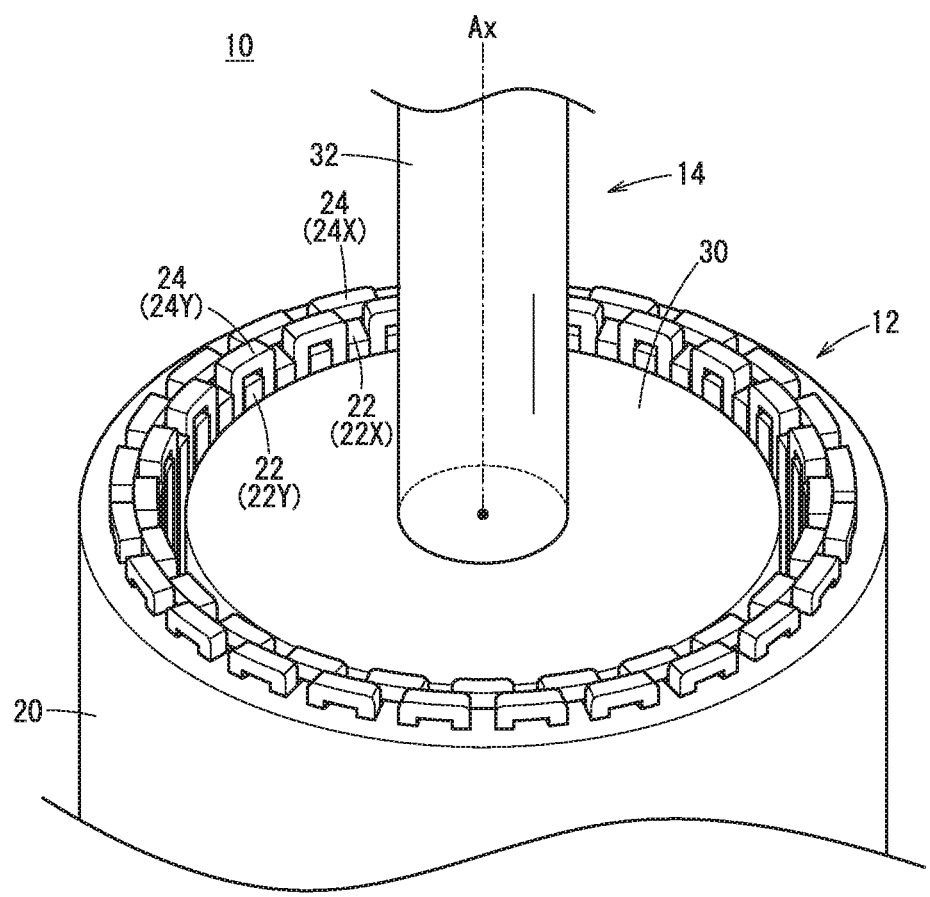
FIG. 1 is a perspective view showing part of a motor of an embodiment of the present invention.
Figure 2:
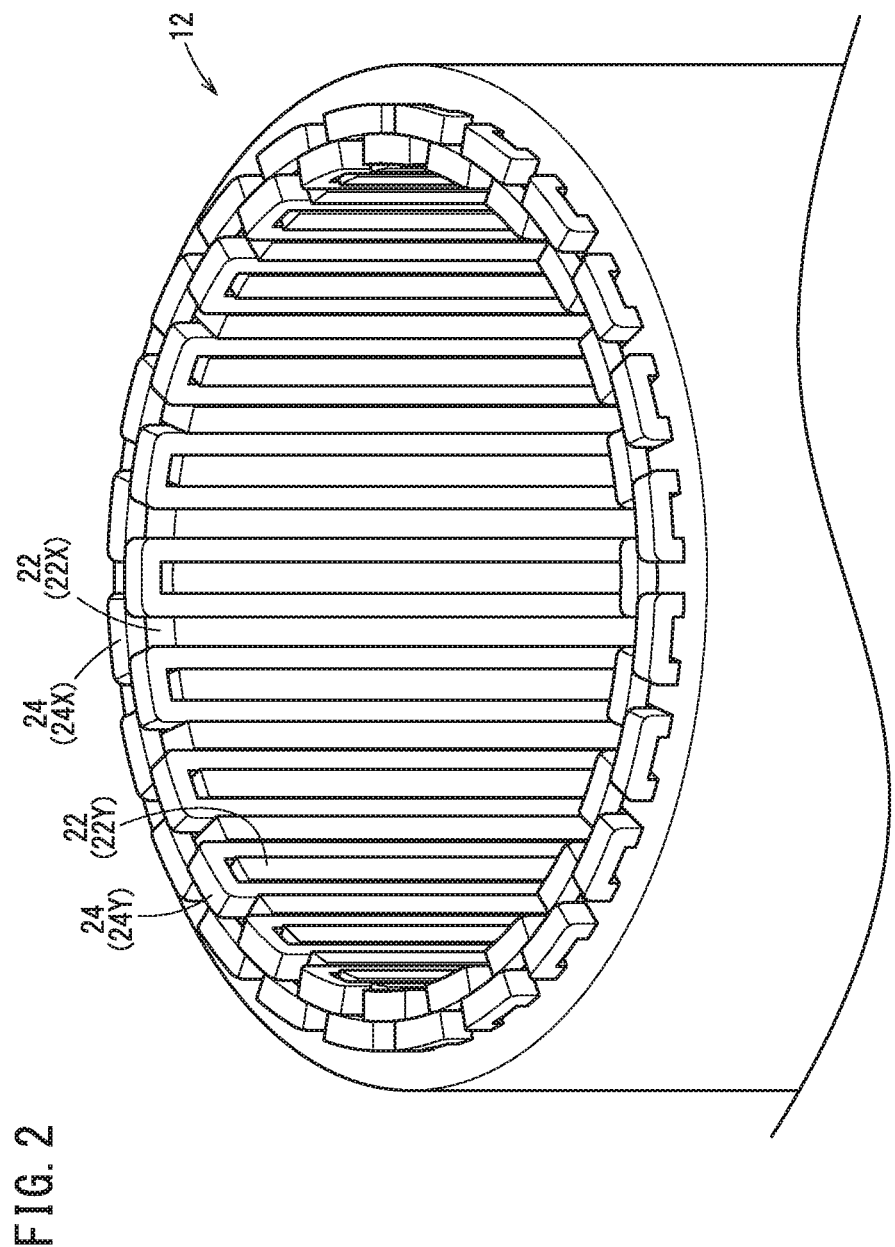
FIG. 2 is a diagram in which the rotor in the motor of FIG. 1 is omitted.

A motor 10 of an embodiment will be described with reference to FIGS. 1 and 2. The motor 10 includes a stator 12 and a rotor 14.

The stator 12 generates a force for rotating the rotor 14. The stator 12 includes a stator core 20, a plurality of teeth 22, and a plurality of coils 24.

The stator core 20 is formed in a tubular shape. The stator core 20 may be formed in a tubular shape by joining a plurality of core pieces in the circumferential direction.

The multiple teeth 22 are arranged on the stator core 20 at intervals in the circumferential direction of the stator core 20. Each of the multiple teeth 22 projects from the inner peripheral surface of the tubular stator core 20 toward the central axis of the stator core 20. The central axis of the stator core 20 coincides with the rotational axis Ax of the motor 10.

Each of the multiple coils 24 is disposed on one tooth 22. That is, the multiple coils 24 are arranged in one-to-one correspondence to the multiple teeth 22. The coil winding (coil wire) of the coil 24 may be a round wire having a circular cross section or a rectangular wire having a rectangular cross section.

The rotor 14 rotates in response to the force generated by the stator 12. The rotor 14 includes a rotor core 30 and a rotor shaft 32.

The rotor core 30 is arranged in the through hole of the tubular stator core 20 with a gap being formed between the rotor core and the inner peripheral surface of the stator core 20. The rotor shaft 32 extends from the rotor core 30 to the outside of the stator core 20 along the central axis of the stator core 20. The central axis of the rotor shaft 32 coincides with the rotational axis Ax of the motor 10.

Figure 3:
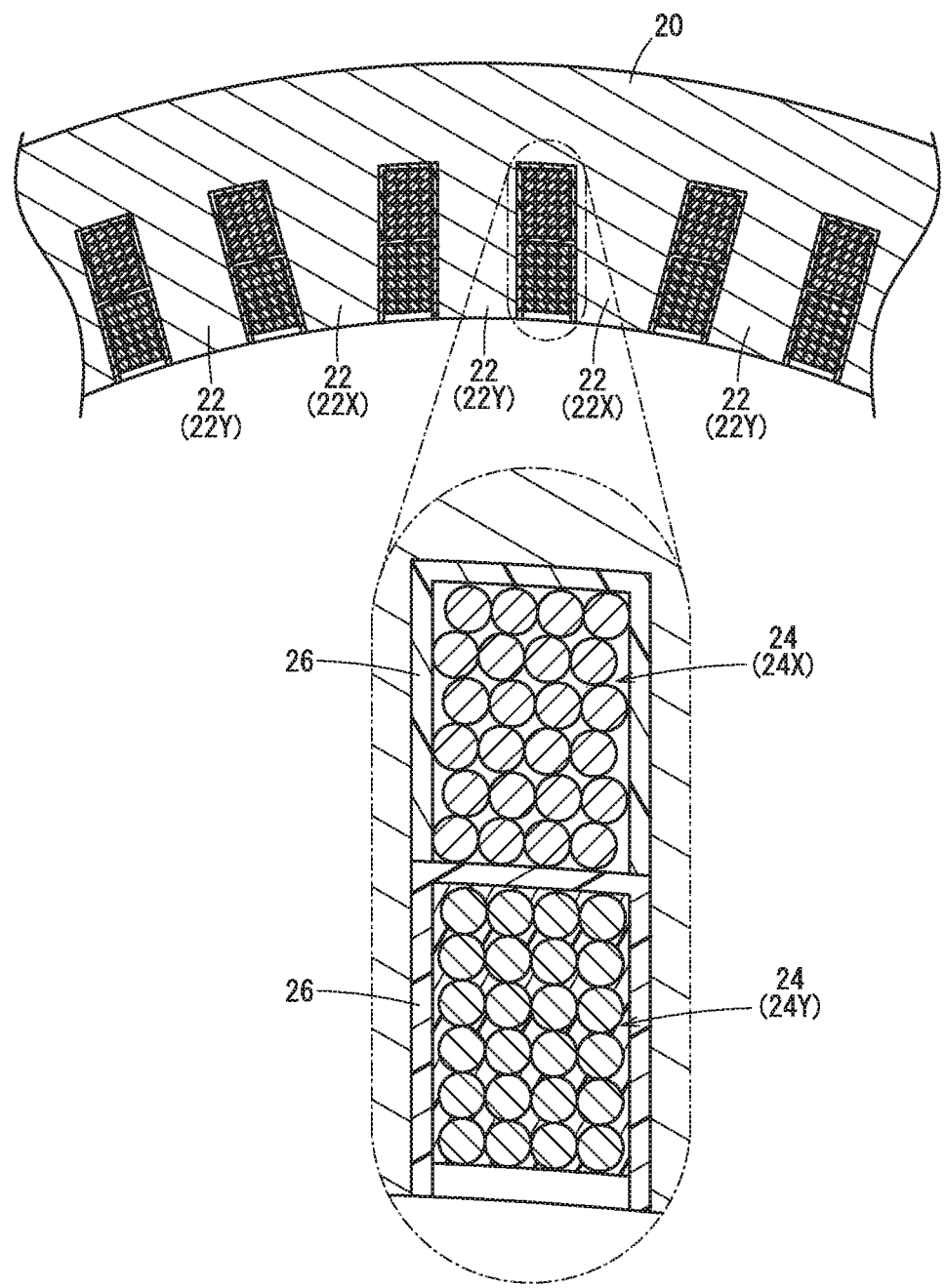
FIG. 3 is a diagram showing part of a stator as viewed from the direction of the rotational axis of the motor.

Referring to FIG. 3, the stator 12 will be described in more detail. In the stator 12 of the present embodiment, the multiple teeth 22 include multiple trapezoidal teeth 22X and multiple rectangular teeth 22Y.

The multiple trapezoidal teeth 22X each have a trapezoidal shape when viewed from the direction along the central axis of the stator core 20. The multiple rectangular teeth 22Y each have a rectangular shape when viewed from the direction along the central axis of the stator core 20. The multiple trapezoidal teeth 22X and the multiple rectangular teeth 22Y are alternately arranged along the circumferential direction of the stator core 20.

Further, in the stator 12 of the present embodiment, the multiple coils 24 include multiple outer coils 24X and multiple inner coils 24Y.

Each of the multiple outer coils 24X is a coil 24 disposed on the proximal side (base side or root side) of one trapezoidal tooth 22X, and each of the multiple inner coils 24Y is a coil 24 disposed on the distal side (tip side) of one rectangular tooth 22Y. The multiple outer coils 24X and the multiple inner coils 24Y are alternately arranged along the circumferential direction of the stator core 20 (i.e., in a staggered manner).

Each coil winding of the outer coils 24X is formed in a non-fixed state. The non-fixed state means a state in which the winding is not wound around a winding core such as a bobbin and a fusing material for self-bonding coil windings is not used. That is, each of the multiple outer coils 24X has neither a winding core nor a fusing material. Each of the multiple outer coils 24X is wound so as to form a hollow, by using a coil wire with no fusing material. The trapezoidal tooth 22X is inserted through the formed hollow, so that the outer coils are placed on the proximal side (base side) of the trapezoidal tooth 22X.

Each coil winding of the multiple inner coils 24Y is formed in a fixed state. The fixed state means a state in which the winding is wound around a winding core or a state in which the winding is fixed with a fusing material. That is, each of the multiple inner coils 24Y includes either a winding core or a fusing material. The method of placing the inner coil 24Y on the rectangular tooth 22Y is not particularly limited. For example, the inner coil 24Y may be formed by winding a coil wire on an insulating winding core that can be fitted onto the rectangular tooth 22Y, and the winding core having the wound wire may be fitted onto the rectangular tooth 22Y, so that the inner coils are placed on the distal side (tip side) of the rectangular tooth 22Y. Alternatively, the inner coil 24Y may be formed by winding a self-bonding coil wire to form a winding coil having a fusing material in a manner capable of fitting onto the rectangular tooth 22Y, and the formed coil may be fitted onto the rectangular tooth 22Y, so that the inner coils are placed on the distal side of the rectangular tooth 22Y.

In the above way, each of the multiple outer coils 24X is provided on the proximal side of the corresponding tooth 22 in the non-fixed state (i.e., without the coil winding being fixed), while each of the multiple inner coils 24Y is provided on the distal side of the corresponding tooth 22 in the fixed state, (i.e., with the coil winding being fixed).

This arrangement makes it unnecessary to create, in the space between the adjacent teeth 22, a clearance between the outer coil 24X and the inner coil 24Y along the direction in which the teeth 22 extend, thus making it possible to suppress the decrease in space factor.

Further, since the coil winding of the inner coil 24Y is fixed, it is possible to prevent protruding out or dislodgement of the coil winding of the outer coil 24X from the tooth 22.

In addition, the outer coil 24X with its coil winding unfixed can be shaped by the inner coil 24Y with its coil winding fixed. Therefore, it is possible to omit the winding core for winding the outer coil 24X, hence reduce the number of parts.

Moreover, when the inner coil 24Y (or the outer coil 24X) is externally inserted onto the tooth 22, interference with the outer coil 24X (or the inner coil 24Y) that has been already inserted in the adjacent tooth 22 will not occur, and hence it is possible to avoid a situation where it becomes difficult to insert the coils. Therefore, the outer coils 24X and the inner coils 24Y can be set easily onto the teeth 22.

In the present embodiment, the teeth 22 include multiple trapezoidal teeth 22X and multiple rectangular teeth 22Y, and the multiple outer coils 24X are provided on the respective trapezoidal teeth 22X, whereas the multiple inner coils 24Y are provided on the respective rectangular teeth 22Y.

As a result, the heat dissipation performance for the coils 24 can be improved as compared with the case where all the multiple teeth 22 are formed of the rectangular teeth 22Y only. Further, in general, it is difficult to wind a coil wire on a winding core to thereby form a coil 24 that fits the shape of the trapezoidal tooth 22X. However, in the stator 12 of the present embodiment, as described above, the outer coil 24X can be shaped by the inner coil 24Y even if the outer coil 24X is not formed to correspond to the shape of the trapezoidal tooth 22X. Therefore, it is possible to suppress the decrease in space factor.

Each of the multiple outer coils 24X and inner coils 24Y is provided with an insulating paper 26. When viewed from the direction along the central axis of the stator core 20, the insulating paper 26 covers three of the four side surfaces of each coil 24, other than one side surface facing the central axis of the stator core 20, and thus the insulating paper has an approximately "Π" shaped section.

More specifically, the insulating paper 26 covers the coil side surface on the trapezoidal tooth 22X side, the coil side surface on the rectangular tooth 22Y side, and the coil side surface on the stator core 20 side, and does not cover the coil side surface on the central axis side of the stator core 20. That is, each of the multiple sheets of insulating paper 26 covers the peripheral side surfaces of one coil 24 (outer coil 24X or inner coil 24Y) other than the coil side surface on the axial core side of the stator core 20.

As a result, each insulating paper 26 that is arranged in the space between the trapezoidal teeth 22X and the rectangular teeth 22Y adjacent to each other in the circumferential direction of the stator core 20 does not overlap another, unlike in the case where all the peripheral side surfaces of each coil 24 are covered. That is, the insulating paper 26 for the outer coil 24X arranged in the space between the adjacent trapezoidal teeth 22X and rectangular teeth 22Y and the insulating paper 26 for the inner coil 24Y arranged in the same space are arranged without contact with each other. Therefore, as compared to the case where all the peripheral side surfaces of one coil 24 are covered, the density of the coils 24 in the space between the trapezoidal teeth 22X and rectangular teeth 22Y adjacent to each other in the circumferential direction of the stator core 20 can be increased. It is noted that "the peripheral side surfaces of the coil 24" indicates the coil side surfaces other than a pair of end surfaces of the coil 24 positioned at the opposite ends in the direction along the central axis of the stator core 20.

[Modification]

The multiple teeth 22 in the above embodiment do not necessarily need to contain the multiple trapezoidal teeth 22X. That is, all the multiple teeth 22 may have the shape of the rectangular tooth 22Y. Even in this case, similarly to the above embodiment, it is not necessary to provide a clearance along the direction in which the teeth 22 extend, between the coils, thus making it possible to suppress the decrease in space factor.

Further, each of the multiple outer coils 24X and the multiple inner coils 24Y may be fixed to the respective tooth 22 with an impregnating material. This makes it possible to reinforce the structure. The impregnating material is different from the fusing material used for the self-bonding coil winding, and contains components different from those of the fusing material. Examples of the impregnating material include varnish.

As an example, a fixing method for fixing the coils 24 to the teeth 22 with an impregnating material may be implemented by immersing the stator 12 in a tank filled with an impregnating material in a molten state (liquid), thereafter taking out the stator from the tank, and then drying the liquid impregnating material coated on the stator 12. Use of this fixing method makes it possible to form an impregnating material (coating) in a cured state (solid) that fixes each of the multiple outer coils 24X and the multiple inner coils 24Y fixed to the respective teeth 22.

As another example of a fixing method for fixing the coils 24 to the teeth 22, there is a method in which a resin is injected (filled) into the interior of the stator 12 in a state that coils 24 are placed onto the teeth 22, and the resin is then cured. Examples of the resin that can be cured after filling include a thermosetting epoxy resin.

[Invention Obtained from the Embodiment]

The inventions that can be grasped from the above embodiments and modifications are described below.

(First Aspect of the Invention)

The first aspect of the invention is a stator (12) including: a stator core (20); a plurality of teeth (22), provided on the stator core (20) at intervals along the circumferential direction of the stator core (20) and protruding from the stator core (20) toward the central axis of the stator core (20); and a plurality of coils (24) provided respectively on the teeth (22). The plurality of coils (24) include a plurality of outer coils (24X) arranged on the proximal side (base side) of the teeth (22) and a plurality of inner coils (24Y) arranged on the distal side (tip side) of the teeth (22); the plurality of outer coils (24X) and the plurality of inner coils (24Y) are alternately arranged along the circumferential direction of the stator core (20); and each coil winding of the plurality of outer coils (24X) is formed in a non-fixed state, and each coil winding of the plurality of inner coils (24Y) is formed in a fixed state.

This configuration makes it unnecessary to create a clearance between the coils along the direction in which the teeth (22) extend, thus making it possible to suppress the decrease in space factor.

The plurality of outer coils (24X) and the plurality of inner coils (24Y) may each be fixed to the respective teeth (22) with an impregnating material or resin. This can reinforce the structure.

The plurality of teeth (22) may include a plurality of trapezoidal teeth (22X) each having a trapezoidal shape when viewed from the direction along the central axis of the stator core (20) and a plurality of rectangular teeth (22Y) each having a rectangular shape when viewed from the direction along the central axis of the stator core (20), the plurality of trapezoidal teeth (22X) and the plurality of rectangular teeth (22Y) may be alternately arranged along the circumferential direction of the stator core (20), and the plurality of outer coils (24X) may be arranged on the respective trapezoidal teeth (22X), and the plurality of inner coils (24Y) may be arranged on the respective rectangular teeth (22Y).

As a result, the heat dissipation performance for the coils (24) can be improved as compared with the case where all the multiple teeth (22) are formed of the rectangular teeth (22Y) only. Further, the outer coil (24X) can be shaped by the inner coil (24Y) even if the outer coil (24X) is not formed so as to correspond to the shape of the trapezoidal tooth (22X). Therefore, it is possible to suppress the decrease in space factor.

(Second Aspect of the Invention)

The second aspect of the invention is a motor (10) including the above-described stator (12) and a rotor (14). Since this motor (10) has the above stator (12), it is possible to suppress the decrease in space factor.

The present invention is not particularly limited to the embodiment described above, and various modifications are possible without departing from the essence and gist of the present invention.

What is claimed is:

1. A stator comprising:
   a stator core;
   a plurality of teeth provided on the stator core at intervals along a circumferential direction of the stator core and protruding from the stator core toward a central axis of the stator core; and
   a plurality of coils provided respectively on the teeth, wherein:
   the plurality of coils include a plurality of outer coils arranged on a base side of the teeth and a plurality of inner coils arranged on a tip side of the teeth;
   the plurality of outer coils and the plurality of inner coils are alternately arranged along the circumferential direction of the stator core;
   each coil winding of the plurality of outer coils is formed in a non-fixed state, and each coil winding of the plurality of inner coils is formed in a fixed state;
   the plurality of teeth include a plurality of trapezoidal teeth each having a trapezoidal shape when viewed from a direction along the central axis of the stator core and a plurality of rectangular teeth each having a rectangular shape when viewed from the direction along the central axis of the stator core;
   the plurality of trapezoidal teeth and the plurality of rectangular teeth are alternately arranged along the circumferential direction of the stator core; and
   the plurality of outer coils are arranged on the respective trapezoidal teeth, and the plurality of inner coils are arranged on the respective rectangular teeth.

2. The stator according to claim 1, wherein the plurality of outer coils and the plurality of inner coils each are fixed to the respective teeth with an impregnating material or resin.

3. The stator according to claim 1, wherein the plurality of coils are arranged in a one-to-one correspondence to the plurality of teeth.

4. The stator according to claim 1, wherein an outer coil of the plurality outer coils is wound so as to form a hollow shape, by using a coil wire with no fusing material, and
   wherein a trapezoidal tooth of the plurality of trapezoidal teeth is inserted through the formed hollow shape, so that the outer coil is placed on a proximal side of the trapezoidal tooth.

5. The stator according to claim 4, wherein an inner coil of the plurality of inner coils is formed by winding a coil wire on an insulating winding core that is fitted onto the a rectangular tooth of the plurality of rectangular teeth, and the winding core includes the wound wire that is fitted onto the rectangular tooth so that the inner coil of the plurality of inner coils is placed on a distal side of the rectangular tooth.

6. The stator according to claim 4, wherein an inner coil of the plurality of inner coils is formed by winding a self-bonding coil wire to form a winding coil having a fusing material in a manner capable of fitting onto a rectangular tooth of the plurality of rectangular teeth, and the formed coil is fitted onto the rectangular tooth of the plurality of rectangular teeth so that the inner coil is placed on a distal side of the rectangular tooth.

7. The stator according to claim 1, wherein an outer coil of the plurality outer coils is wound so as to form a hollow shape, and
wherein a trapezoidal tooth of the plurality of trapezoidal teeth is inserted through the formed hollow shape, so that the outer coil is placed on a proximal side of the trapezoidal tooth.

8. The stator according to claim 7, wherein an inner coil of the plurality of inner coils is formed by winding a coil wire on an insulating winding core that is fitted onto the a rectangular tooth of the plurality of rectangular teeth, and the winding core includes the wound wire that is fitted onto the rectangular tooth so that the inner coil of the plurality of inner coils is placed on a distal side of the rectangular tooth.

9. The stator according to claim 7, wherein an inner coil of the plurality of inner coils is formed by winding a self-bonding coil wire to form a winding coil having a fusing material in a manner capable of fitting onto a rectangular tooth of the plurality of rectangular teeth, and the formed coil is fitted onto the rectangular tooth of the plurality of rectangular teeth so that the inner coil is placed on a distal side of the rectangular tooth.

10. The stator according to claim 1, wherein a trapezoidal tooth of the plurality of trapezoidal teeth is inserted through an outer coil of the plurality outer coils, so that the outer coil is placed on a proximal side of the trapezoidal tooth.

11. The stator according to claim 10, wherein an inner coil of the plurality of inner coils is formed by winding a coil wire on an insulating winding core that is fitted onto the a rectangular tooth of the plurality of rectangular teeth, and the winding core includes the wound wire that is fitted onto the rectangular tooth so that the inner coil of the plurality of inner coils is placed on a distal side of the rectangular tooth.

12. The stator according to claim 10, wherein an inner coil of the plurality of inner coils is formed by winding a self-bonding coil wire to form a winding coil having a fusing material in a manner capable of fitting onto a rectangular tooth of the plurality of rectangular teeth, and the formed coil is fitted onto the rectangular tooth of the plurality of rectangular teeth so that the inner coil is placed on a distal side of the rectangular tooth.

13. The stator according to claim 1, wherein an inner coil of the plurality of inner coils includes one of a winding core or a fusing material.

14. The stator according to claim 1, wherein an inner coil of the plurality of inner coils is formed by winding a coil wire on an insulating winding core that is fitted onto the a rectangular tooth of the plurality of rectangular teeth, and the winding core includes the wound wire that is fitted onto the rectangular tooth so that the inner coil of the plurality of inner coils is placed on a distal side of the rectangular tooth.

15. The stator according to claim 1, wherein an inner coil of the plurality of inner coils is formed by winding a self-bonding coil wire to form a winding coil having a fusing material in a manner capable of fitting onto a rectangular tooth of the plurality of rectangular teeth, and the formed coil is fitted onto the rectangular tooth of the plurality of rectangular teeth so that the inner coil is placed on a distal side of the rectangular tooth.

16. A motor comprising a stator and a rotor, wherein the stator includes:
a stator core;
a plurality of teeth provided on the stator core at intervals along a circumferential direction of the stator core and protruding from the stator core toward a central axis of the stator core; and
a plurality of coils provided respectively on the teeth, wherein:
the plurality of coils include a plurality of outer coils arranged on a base side of the teeth and a plurality of inner coils arranged on a tip side of the teeth;
the plurality of outer coils and the plurality of inner coils are alternately arranged along the circumferential direction of the stator core;
each coil winding of the plurality of outer coils is formed in a non-fixed state, and each coil winding of the plurality of inner coils is formed in a fixed state;
the plurality of teeth include a plurality of trapezoidal teeth each having a trapezoidal shape when viewed from a direction along the central axis of the stator core and a plurality of rectangular teeth each having a rectangular shape when viewed from the direction along the central axis of the stator core;
the plurality of trapezoidal teeth and the plurality of rectangular teeth are alternately arranged along the circumferential direction of the stator core; and
the plurality of outer coils are arranged on the respective trapezoidal teeth, and the plurality of inner coils are arranged on the respective rectangular teeth.

17. The motor according to claim 16, wherein the plurality of outer coils and the plurality of inner coils each are fixed to the respective teeth with an impregnating material or resin.

18. A stator comprising:
a stator core;
a plurality of teeth provided on the stator core at intervals along a circumferential direction of the stator core and protruding from the stator core toward a central axis of the stator core; and
a plurality of coils provided respectively on the teeth, wherein:
the plurality of coils include a plurality of outer coils arranged on a base side of the teeth and a plurality of inner coils arranged on a tip side of the teeth;
the plurality of teeth include a plurality of trapezoidal teeth each having a trapezoidal shape when viewed from a direction along the central axis of the stator core and a plurality of rectangular teeth each having a rectangular shape when viewed from the direction along the central axis of the stator core; and
the plurality of outer coils are arranged on the respective trapezoidal teeth, and the plurality of inner coils are arranged on the respective rectangular teeth.

\* \* \* \* \*